(12) United States Patent
Sung et al.

(10) Patent No.: US 10,805,021 B2
(45) Date of Patent: Oct. 13, 2020

(54) TRANSMISSION PERFORMANCE MONITORING METHOD FOR MONITORING TRANSMISSION PERFORMANCE BASED ON ANALOG OPTICAL LINK, AND MONITORING APPARATUS PERFORMING THE METHOD

(71) Applicant: ELECTRONICS AND TELECOMMUNICATIONS RESEARCH INSTITUTE, Daejeon (KR)

(72) Inventors: Minkyu Sung, Seoul (KR); Joonyoung Kim, Daejeon (KR); Jong Hyun Lee, Daejeon (KR); Seung-Hyun Cho, Sejong-si (KR)

(73) Assignee: ELECTRONICS AND TELECOMMUNCATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/529,929

(22) Filed: Aug. 2, 2019

(65) Prior Publication Data

US 2020/0044756 A1 Feb. 6, 2020

(30) Foreign Application Priority Data

Aug. 6, 2018 (KR) .................. 10-2018-0091144

(51) Int. Cl.
*H04B 10/079* (2013.01)
*H04B 17/336* (2015.01)
*H04B 10/2575* (2013.01)
*H04B 10/114* (2013.01)

(52) U.S. Cl.
CPC ..... *H04B 17/336* (2015.01); *H04B 10/07953* (2013.01); *H04B 10/114* (2013.01); *H04B 10/2575* (2013.01)

(58) Field of Classification Search
CPC ......... H04B 10/2575; H04B 10/07953; H04B 10/114; H04B 17/336
See application file for complete search history.

(56) References Cited

U.S. PATENT DOCUMENTS

| 8,050,554 | B2 | 11/2011 | Jang et al. | |
|---|---|---|---|---|
| 2007/0230403 | A1* | 10/2007 | Douglas | ............... H04W 24/00 370/334 |
| 2010/0157876 | A1 | 6/2010 | Song et al. | |
| 2012/0213259 | A1* | 8/2012 | Renken | ............ H04N 21/42676 375/222 |
| 2013/0272696 | A1 | 10/2013 | Palanisamy et al. | |
| 2016/0112889 | A1 | 4/2016 | Moon et al. | |
| 2016/0219611 | A1* | 7/2016 | Jo | ..................... H04W 72/1231 |
| 2017/0238318 | A1 | 8/2017 | Lemson et al. | |
| 2019/0174162 | A1* | 6/2019 | Soltanpur | ......... H04B 10/2575 |

FOREIGN PATENT DOCUMENTS

KR 10-2013-005068 A 5/2013

* cited by examiner

*Primary Examiner* — Dzung D Tran
(74) *Attorney, Agent, or Firm* — LRK Patent Law Firm

(57) ABSTRACT

A transmission performance monitoring method for monitoring a transmission performance based on an analog optical link and an apparatus performing the method. The transmission performance monitoring method and apparatus centrally monitor an RF signal transmission performance in an analog optical link-based mobile haul or indoor distributed antenna system.

16 Claims, 6 Drawing Sheets

1

TRANSMISSION PERFORMANCE MONITORING METHOD FOR MONITORING TRANSMISSION PERFORMANCE BASED ON ANALOG OPTICAL LINK, AND MONITORING APPARATUS PERFORMING THE METHOD

CROSS-REFERENCE TO RELATED APPLICATION(S)

This application claims the priority benefit of Korean Patent Application No. 10-2018-0091144, filed Aug. 6, 2018, in the Korean Intellectual Property Office, the disclosure of which is incorporated herein by reference for all purposes.

BACKGROUND

1. Field of the Invention

One or more example embodiments relate to a method of monitoring a performance of an analog optical link-based transmission and a monitoring apparatus performing the method.

2. Description of Related Art

Recently, data traffic required for mobile communication system is explosively increasing as a use of mobile contents requiring a large capacity such as 4K video streaming service is increasing. The mobile communication system employs cloud radio access network (C-RAN), function split, and radio-over-fiber (RoF) technology. The C-RAN is a network for accommodating increased mobile data traffic. The function split and the RoF technology are technologies to increase data reception capacity in a mobile fronthaul section. Such technologies have been proposed as a network or technology for efficiently providing upcoming 5G mobile communication services.

In addition, since most mobile data traffic occurs in indoor environments, the use of analog IFoF optical transmission technology has been proposed for economical construction and operation of an indoor distributed antenna system (IDAS) for indoor use. Here, the IDAS is a 5G mobile communication system for providing a high-quality service and eliminating a shadow area in the indoor environment.

When the analog IFoF optical transmission technology is adopted, an amount of data traffic required for the IDAS is the same as a bandwidth of a baseband mobile communication signal, so the network construction and operation cost is drastically reduced compared to the conventional digital transmission technology.

A communication service provider monitors a transmission performance for effective operation of the mobile fronthaul using the analog IFoF-based optical transmission method or the network of the IDAS. The communication service provider performs monitoring essential for network management. An adjacent channel leakage ratio (ACLR) and a carrier-to-noise ratio (CNR) are parameters that measure the transmission performance of the conventional analog link.

The CNR is a value representing a ratio between carrier power and noise power, and has been widely used as a measure for measuring the transmission performance in an analog optical link such as a cable antenna television (CATV). In other words, since an occupied frequency bandwidth is not wide in a case of the conventional analog optical link, the transmission performance may be measured through a demodulation process after an analog-to-digital converter (ADC) process using an electrical splitter or measured in the using analog optical link using a spectrum analyzer.

However, in a case of 5G signals, a large bandwidth is required. Thus, the demodulation process using the electric splitter and the ADC is not practical because of the high price and complexity. When the spectrum analyzer is used, measurement may be performed on each link/FA. Also, since the cost of the analyzer is large, it is not efficient in monitoring the performance of the network operating in real time.

SUMMARY

An aspect provides a transmission performance monitoring method and apparatus for monitoring an RF signal transmission performance in an indoor distributed antenna system (IDAS) or a mobile fronthaul based on an analog optical link.

Another aspect also provides a transmission performance monitoring method and apparatus for monitoring an RF signal transmission performance based on a carrier-to-noise ratio (CNR) in an analog optical link using an under-sampling.

According to an aspect, there is provided a transmission performance monitoring method, including receiving an analog radio frequency (RF) signal based on an analog optical link, filtering the analog RF signal, converting the filtered analog RF signal into a digital RF signal, under-sampling the converted digital RF signal, determining a carrier to noise ratio (CNR) of an analog RF signal corresponding to the under-sampled digital RF signal, and monitoring a transmission performance of the analog optical link using the analog RF signal of which the CNR is determined.

The receiving of the analog RF signal may include receiving an analog RF signal having a frequency of a band higher than that of a baseband signal.

The filtering of the analog RF signal may include filtering an analog RF signal based on a frequency range of a tone signal or a desired signal to be monitored.

The under-sampling may include setting a sampling frequency used for down-conversion to a digital RF signal having a lower frequency compared to that of the converted digital RF signal and under-sampling a digital RF signal converted using the sampling frequency.

The setting of the sampling frequency may include setting a sampling frequency based on a high-frequency of the converted digital RF signal and a low-frequency of the converted digital RF signal.

A maximum frequency and a minimum frequency of the converted digital RF signal may be determined based on a bandwidth of the converted digital RF signal.

The under-sampling may include determining an integer value n for under-sampling the converted digital RF signal from the sampling frequency, the integer value n being greater than 1 and under-sampling the converted digital RF signal into a Nyquist region based on the determined integer value n.

The determining of the CNR may include converting the under-sampled digital RF signal into an analog RF signal and determining a CNR representing an amplitude difference between noise and a carrier wave from the converted analog RF signal.

According to another aspect, there is also provided a monitoring apparatus including a processor, wherein the processor is configured to receive an analog RF signal based on an analog optical link, filter the analog RF signal, convert the filtered analog RF signal into a digital RF signal, under-sample the converted digital RF signal, determine a carrier to noise ratio (CNR) of an analog RF signal corresponding to the under-sampled digital RF signal, and monitor a transmission performance of the analog optical link using the analog RF signal of which the CNR is determined.

The processor may be configured to receive an analog RF signal having a frequency of a band higher than that of a baseband signal.

The processor may be configured to filter an analog RF signal based on a frequency range of a tone signal or a desired signal to be monitored.

The processor may be configured to set a sampling frequency used for down-conversion to a digital RF signal having a lower frequency compared to that of the converted digital RF signal, and under-sample a digital RF signal converted using the sampling frequency.

The processor may be configured to set a sampling frequency based on a high-frequency of the converted digital RF signal and a low-frequency of the converted digital RF signal.

A maximum frequency and a minimum frequency of the converted digital RF signal are determined based on a bandwidth of the converted digital RF signal.

The processor may be configured to determine an integer value n for under-sampling the converted digital RF signal from the sampling frequency, the integer value n being greater than 1, and under-sample the converted digital RF signal into a Nyquist region based on the determined integer value n.

The processor may be configured to convert the under-sampled digital RF signal into an analog RF signal and determine a CNR representing an amplitude difference between noise and a carrier wave from the converted analog RF signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
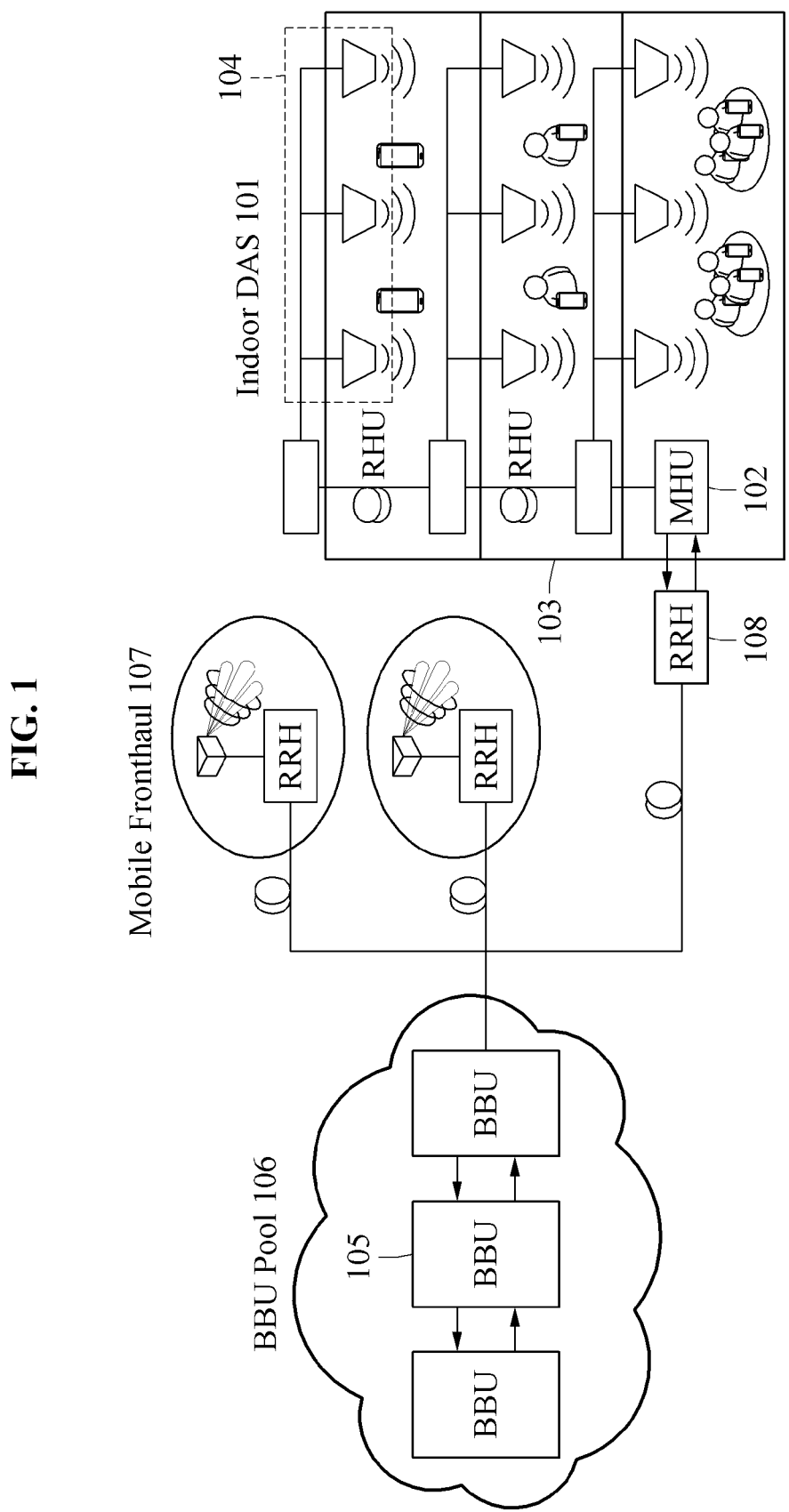
FIG. 1 is a diagram illustrating an overall system for monitoring a transmission performance associated with a carrier to noise ratio (CNR) based on an analog optical link according to an example embodiment.

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating an overall system for monitoring a transmission performance associated with a carrier to noise ratio (CNR) based on an analog optical link according to an example embodiment.

Referring to FIG. 1, a monitoring apparatus may monitor a transmission performance based on an analog optical link. For example, the monitoring apparatus may monitor a radio frequency (RF) signal transmission performance in a mobile fronthaul 107 based on an analog optical link or an indoor distributed antenna system (IDAS) 101.

Specifically, a cloud radio access network (C-RAN) is an RAN in which a remote radio head (RRH) or an RF device 108 is disconnected from a digital unit (DU) or baseband unit (BBU) 105 of an existing base station, digital units of various base stations are gathered at a center (BBU pool 106) to be processed, and the RF device 108 is distributed in a service region. The BBU pool 106 and the RF device 108 may transmit and receive a signal to the mobile fronthaul 107 which is an optical link for mutual connection.

The monitoring apparatus may monitor a performance of transmitting an analog RF signal based on an analog optical link in a process of transmitting a signal from the DU 105 to the RF device 108.

The IDAS 101 may be an antenna system used for solving a high traffic capacity issue in an indoor environment by spatially distributing a small-output antenna in the indoor environment. The IDAS 101 may include a main hub unit (MHU) 102, a remote hub unit (RHU) and a radio frequency unit (RU) 104. The MHU 102 may be connected to the RF device 108 to convert a signal received from the RF device 108 into an optical signal. The MHU 102 may transmit the converted optical signal to the RHU 103. The RHU 103 may transmit the optical signal transmitted from the MHU 102 to a plurality of RUs 104 located indoors. The RHU 103 may be connected to at most eight RUs 104.

The monitoring apparatus may monitor a performance of transmitting an analog RF signal based on an analog optical link in a process of transmission performed between the RHUs 103 on the optical signal transmitted from the MHU 102.

As such, the monitoring apparatus may monitor an RF signal transmission performance in an analog optical link-based mobile fronthaul or indoor distributed antenna system. The monitoring apparatus may monitor an RF signal transmission performance based on a CNR in an analog optical link using an under-sampling.

The monitoring apparatus may be inserted in an analog optical transceiver used in the mobile fronthaul or indoor distributed antenna system. The monitoring apparatus may be inserted in the analog optical transceiver to monitor the RF signal transmission performance.

Here, the monitoring apparatus may be implemented at a low cost in terms of a network structure for monitoring the RF signal transmission performance by using a low-cost analog-to-digital converter when down-converting a digital RF signal through the under-sampling.

Figure 2:
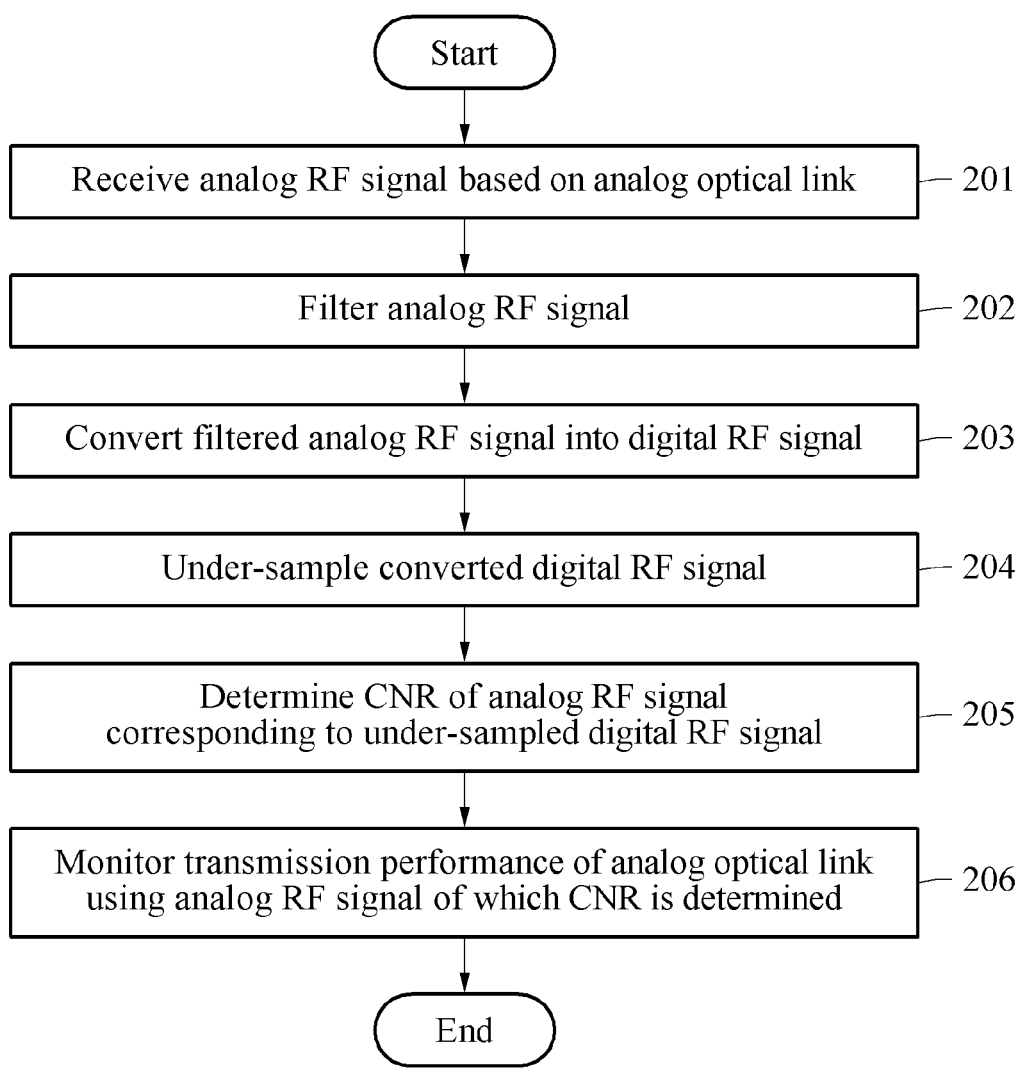
FIG. 2 is a flowchart illustrating a transmission performance monitoring method according to an example embodiment.

FIG. 2 is a flowchart illustrating a transmission performance monitoring method according to an example embodiment.

In operation 201, a monitoring apparatus may receive an analog radio frequency (RF) signal based on an analog optical link. The monitoring apparatus may receive an analog RF signal having a frequency of a band higher than that of a baseband signal. Here, the baseband may be a frequency band used to modulate a predetermined carrier wave.

In operation 202, the monitoring apparatus may filter the analog RF signal. The monitoring apparatus may filter an analog RF signal based on a frequency range of a tone signal or a desired signal to be monitored. The desired signal may be a signal to be actually transmitted in a mobile fronthaul or an indoor distributed antenna system. The tone signal may be an audible frequency signal in a voice frequency band, and may be a signal used for calibrating signal to a noise (S/N) characteristic of an analog signal transmission system.

In operation 203, the monitoring apparatus may convert the filtered analog RF signal into a digital RF signal. The monitoring apparatus may convert an analog RF signal into a digital RF signal using a signal converter. The signal converter may be an analog-to-digital converter (ADC).

In operation 204, the monitoring apparatus may under-sample the converted digital RF signal. The monitoring apparatus may set a sampling frequency for down-converting the digital RF signal. In other words, the monitoring apparatus may set a sampling frequency used for down-conversion to a digital RF signal having a lower frequency compared to that of the converted digital RF signal.

The sampling frequency may be set based on a maximum frequency and a minimum frequency of the converted digital RF signal. The maximum frequency and a minimum frequency of the converted digital RF signal may be determined based on a bandwidth of the converted digital RF signal.

The monitoring apparatus may under-sample the digital RF signal converted using the sampling frequency. The monitoring apparatus may determine an integer value n for under-sampling the converted digital RF signal from the sampling frequency, the integer value n being greater than 1. The monitoring apparatus may under-sample the converted digital RF signal into a Nyquist region based on the determined integer value n.

In operation 205, the monitoring apparatus may determine a CNR of an analog RF signal corresponding to the under-sampled digital RF signal. The monitoring apparatus may convert the under-sampled digital RF signal into an analog RF signal. The monitoring apparatus may convert the sampled digital RF signal into an analog RF signal using a signal converter. Here, the signal converter may be a digital-to-analog converter (DAC).

The monitoring apparatus may determine a CNR representing an amplitude difference between noise and a carrier wave from the converted analog RF signal.

In operation 206, the monitoring apparatus may monitor a transmission performance of the analog optical link using the analog RF signal of which the CNR is determined.

As such, the monitoring apparatus may perform under-sampling on an analog RF signal having a frequency of a band higher than that of a baseband signal based on an analog optical link, thereby indirectly monitoring a transmission performance of the analog optical link based on the CNR of the under-sampled analog RF signal.

Figure 3:
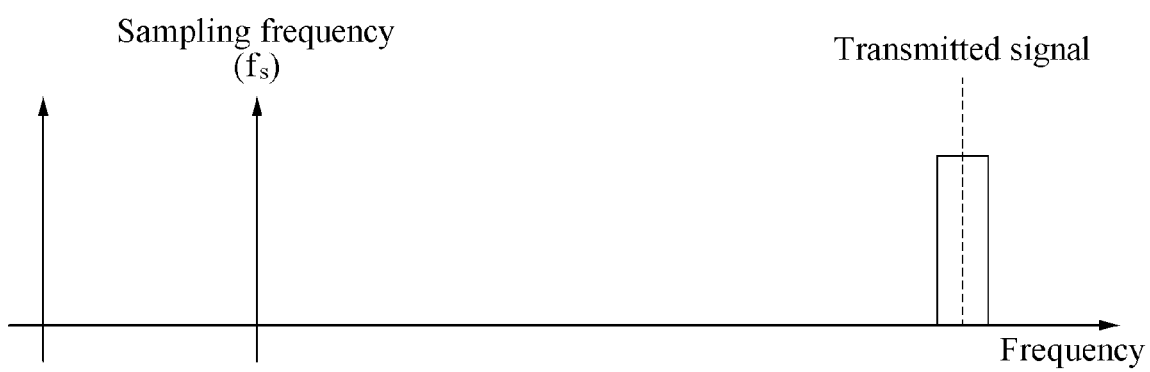
FIG. 3 is a diagram illustrating a sampling frequency of a digital radio frequency (RF) signal according to an example embodiment.

FIG. 3 is a diagram illustrating a sampling frequency of a digital RF signal according to an example embodiment.

Referring to FIG. 3, a monitoring apparatus may set a sampling frequency for down-converting a converted digital RF signal. The monitoring apparatus may set a sampling frequency used for down-conversion to a digital RF signal having a lower frequency compared to that of the converted digital RF signal.

In general, when a sender transmits a signal, a predetermined area of a signal may be transmitted instead of the entire area of the signal. In this example, a receiver may restore the entire area of the signal from the predetermined area of the signal. Sampling may indicate an operation of dividing the signal into a predetermined area such that the receiver recovers the entire area of the signal. The signal divided into the predetermined area may be restored to be the entire area by the receiver when a condition according to a frequency of a signal to be transmitted is satisfied. The condition may correspond to a Nyquist theory.

The Nyquist theory may be that a signal to be transmitted, for example, an original signal is restored by sampling the original signal at a frequency at least twice a maximum frequency under a condition of avoid interference between symbols when transmitting the signal. Also, the Nyquist theory may perform sampling at a frequency two times higher than a highest frequency of the original signal as shown in Equation 1.

$$f_s \geq 2f_{high} \qquad \text{[Equation 1]}$$

According to Equation 1, $f_s$ denotes a sampling frequency and $f_{high}$ denotes a maximum frequency of an original signal to be transmitted.

When the Nyquist theory satisfies the aforementioned condition, the Nyquist theory may avoid aliasing. The aliasing may be a signal distortion occurring when neighboring spectra overlap each other due to inadequate filtering or a sampling frequency less than twice the maximum frequency of an analog signal in a process of sampling the signal.

In the present disclosure, a sampling frequency may be set to down-convert the digital RF signal in consideration of a frequency response characteristic of the Nyquist theory. Specifically, the monitoring apparatus may receive an analog RF signal based on an analog optical link. The monitoring apparatus may convert the analog RF signal to a digital RF signal using an ADC converter. As described above, the SDC converter that digitalize the analog RF signal may have a sampling rate at least twice that of the digital RF signal. Here, a large sampling rate may be required to sample an RF signal having a high frequency based on the Nyquist theory. In other words, the Nyquist theory is a scheme for restoring a signal by up-converting the digital RF signal and thus, a large sampling rate may be required. This may be impractical because of increases in cost and complexity of a sample circuit. To solve this issues, the present disclosure may employ an under-sampling.

The monitoring apparatus may apply the under-sampling to monitor a transmission performance of an analog RF signal based on an analog optical link, thereby down-converting a digital RF signal corresponding to a received analog RF signal.

A spectrum of FIG. 3 may be a frequency spectrum of a digital RF signal obtained before the under-sampling is applied. The spectrum of FIG. 3 may include a sampling frequency and a digital RF signal corresponding to an analog RF signal based on an analog optical link.

Figure 4:
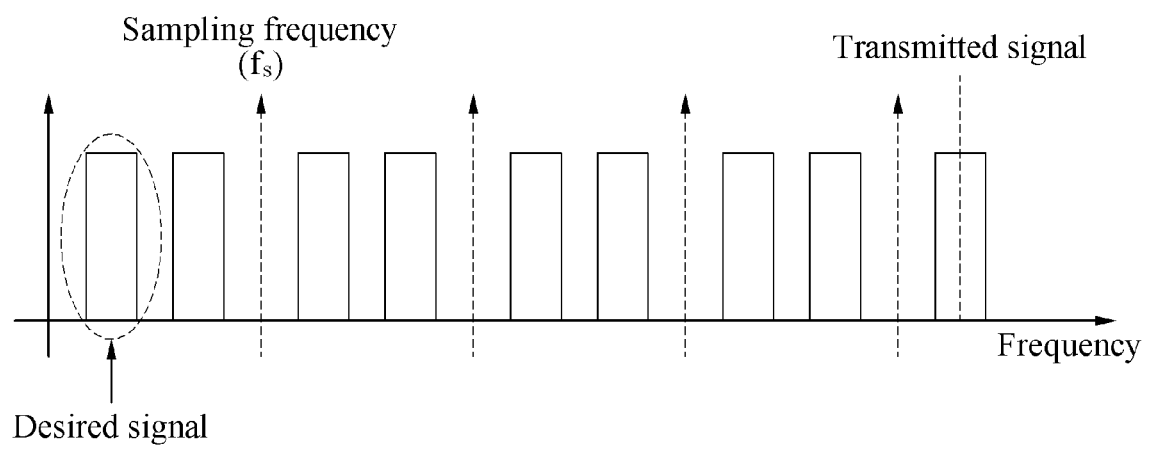
FIG. 4 is a diagram illustrating an under-sampling result of a digital RF signal according to an example embodiment.

FIG. 4 is a diagram illustrating an under-sampling result of a digital RF signal according to an example embodiment.

Referring to FIG. 4, a monitoring apparatus may receive an analog RF signal based on an analog optical link. Here, the received analog RF signal may be an analog RF signal having a frequency of a band higher than that of a baseband signal. For example, the received analog RF signal may be a signal in a band higher than that of a certain signal of the baseband to be transmitted through the analog optical link.

The monitoring apparatus may convert the analog RF signal having a frequency of a band higher than the baseband into a digital RF signal. The monitoring apparatus may under-sample the converted digital RF signal to be a clock having a sampling frequency lower than that of the converted digital RF signal.

The monitoring apparatus may under-sample the digital RF signal, thereby estimating a desired signal to be monitored.

Figure 5:
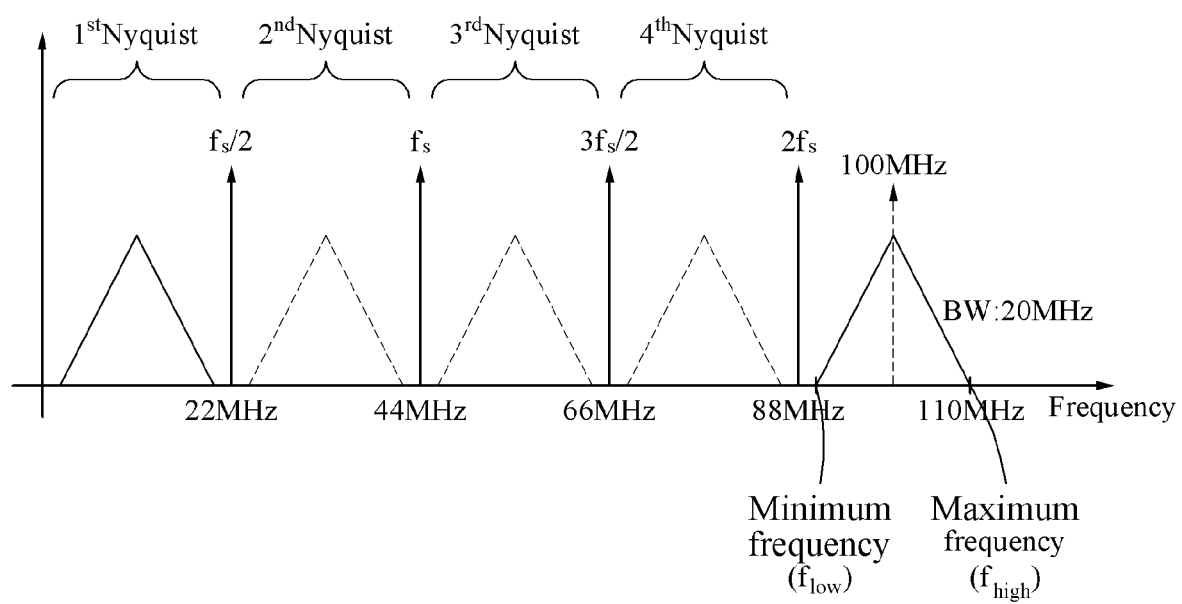
FIG. 5 is a diagram illustrating a result of down-conversion performed on a digital RF signal based on under-sampling according to an example embodiment.

FIG. 5 is a diagram illustrating a result of down-conversion performed on a digital RF signal based on under-sampling according to an example embodiment.

A spectrum of FIG. 5 may represent a result of down-conversion performed on a digital RF signal by applying under-sampling a digital RF signal.

The monitoring apparatus may under-sample the converted digital RF signal. The monitoring apparatus may set a sampling frequency used for down-conversion to a digital RF signal having a lower frequency compared to that of the converted digital RF signal. Here, the monitoring apparatus may set the sampling frequency according to Equation 2.

$$\frac{2f_{high}}{n} \leq f_s \leq \frac{2f_{low}}{n-1},$$ [Equation 2]

and any integer n:

$$1 \leq n \leq \left\lfloor \frac{f_{high}}{f_{low} - f_{high}} \right\rfloor$$

In Equation 2, $f_s$ denotes a sampling frequency and $f_{high}$ denotes a maximum frequency of a digital RF signal. Also, $f_{low}$ denotes a minimum frequency of the digital RF signal.

The monitoring apparatus may under-sample the digital RF signal by setting the sampling frequency $f_s$ under a condition of Equation 2. Specifically, the monitoring apparatus may set the sampling frequency based on the maximum frequency and the minimum frequency of the digital RF signal. The maximum frequency and the minimum frequency of the digital RF signal may be determined based on a bandwidth of the digital RF signal.

The monitoring apparatus may determine an integer value n for under-sampling the converted digital RF signal from the sampling frequency, the integer value n being greater than 1.

For example, the bandwidth of the digital RF signal may be 20 megahertz (MHz) and a center frequency of the digital RF signal may be 100 MHz. The monitoring apparatus may determine the maximum frequency of the digital RF signal to be 110 MHz and the minimum frequency of the digital RF signal to be 90 MHz based on the bandwidth and the center frequency of the digital RF signal. Also, the monitoring apparatus may obtain a range of n, for example, $1 \leq n \leq 5$ from $f_{high}$ (110 MHz) and $f_{low}$ (90 MHz). When n is set to be 5, the monitoring apparatus may set the range to be about 44 MHz $\leq f_s \leq$ 45 MHz. As such, the monitoring apparatus may set a range of the sampling frequency for restoring a desired signal from the digital RF signal.

The monitoring apparatus may under-sample the converted digital RF signal into a Nyquist region based on the determined integer value n. When the monitoring apparatus sets $f_s$ be 44 MHz, the converted digital RF signal may be down-converted in four Nyquist regions as shown in FIG. 5.

Through this, the monitoring apparatus may down-convert the digital RF signal through the under-sampling. When $f_s$ is set under the aforementioned condition and the under-sampling is used, down-conversion may be available.

Figure 6:
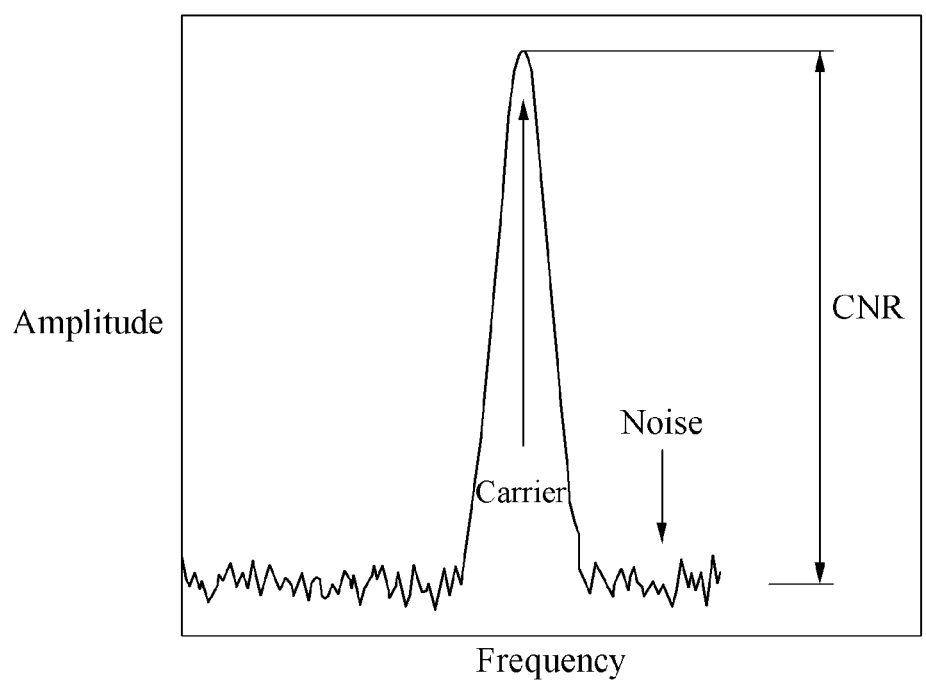
FIG. 6 is a diagram illustrating a CNR of an analog RF signal according to an example embodiment.

FIG. 6 is a diagram illustrating a CNR of an analog RF signal according to an example embodiment.

Referring to FIG. 6, a monitoring apparatus may monitor a performance of transmitting an analog RF signal based on an analog optical link by applying a down-conversion of an under-sampling. The monitoring apparatus may monitor a transmission performance based on an analog optical link using a CRN of the analog RF signal.

Specifically, the monitoring apparatus may monitor a transmission performance of an analog optical link in an indoor DAS or a mobile fronthaul configured based on the analog optical link. The monitoring apparatus may be for centrally managing a transmission performance of the optical link. The present disclosure provides a function of monitoring a transmission performance of an optical link in an analog optical transceiver, thereby realizing economical network construction and operation.

To this end, the monitoring apparatus may convert the under-sampled digital RF signal into an analog RF signal. The monitoring apparatus may determine a CNR representing an amplitude difference between noise and a carrier wave from the converted analog RF signal.

The monitoring apparatus may monitor a transmission performance of the analog optical link using the analog RF signal of which the CNR is determined.

According to example embodiments, a performance monitoring method may monitor an RF signal transmission performance in an IDAS or a mobile fronthaul based on an analog optical link.

According to example embodiments, a transmission performance monitoring method may monitor an RF signal transmission performance based on a CRN in an analog optical link using an under-sampling.

According to example embodiments, a monitoring apparatus may be inserted into an analog optical transceiver used in an IDAS or a mobile fronthaul to simplify a network structure for monitoring an RF signal transmission performance.

According to example embodiments, a monitoring apparatus may use a low cost ADC and thus, be implemented at a low cost in terms of a network structure for monitoring an RF signal transmission performance.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmission performance monitoring method comprising:
    receiving an analog radio frequency (RF) signal over an analog optical link based on a radio-over-fiber (RoF) technology or an analog intermediate-frequency-over-fiber (IFoF) optical transmission technology;
    filtering the analog RF signal;
    converting the filtered analog RF signal into a digital RF signal;
    under-sampling the converted digital RF signal;
    determining a carrier to noise ratio (CNR) of an analog RF signal corresponding to the under-sampled digital RF signal; and
    monitoring a transmission performance of the analog optical link using the analog RF signal of which the CNR is determined.

2. The transmission performance monitoring method of claim 1, wherein the receiving of the analog RF signal comprises receiving an analog RF signal having a frequency of a band higher than that of a baseband signal.

3. The transmission performance monitoring method of claim 1, wherein the filtering of the analog RF signal comprises filtering an analog RF signal based on a frequency range of a tone signal or a desired signal to be monitored.

4. The transmission performance monitoring method of claim 1, wherein the determining of the CNR comprises:
    converting the under-sampled digital RF signal into an analog RF signal; and
    determining a CNR representing an amplitude difference between noise and a carrier wave from the converted analog RF signal.

5. A transmission performance monitoring method comprising:
    receiving an analog radio frequency (RF) signal based on an analog optical link;
    filtering the analog RF signal;
    converting the filtered analog RF signal into a digital RF signal;
    under-sampling the converted digital RF signal;
    determining a carrier to noise ratio (CNR) of an analog RF signal corresponding to the under-sampled digital RF signal; and
    monitoring a transmission performance of the analog optical link using the analog RF signal of which the CNR is determined,
    wherein the under-sampling comprises:

setting a sampling frequency used for down-conversion to a digital RF signal having a lower frequency compared to that of the converted digital RF signal; and under-sampling a digital RF signal converted using the sampling frequency.

6. The transmission performance monitoring method of claim 5, wherein the setting of the sampling frequency comprises setting a sampling frequency based on a high-frequency of the converted digital RF signal and a low-frequency of the converted digital RF signal.

7. The transmission performance monitoring method of claim 6, wherein a maximum frequency and a minimum frequency of the converted digital RF signal are determined based on a bandwidth of the converted digital RF signal.

8. The transmission performance monitoring method of claim 5, wherein the under-sampling comprises:

determining an integer value n for under-sampling the converted digital RF signal from the sampling frequency, the integer value n being greater than 1; and under-sampling the converted digital RF signal into a Nyquist region based on the determined integer value n.

9. A monitoring apparatus comprising:

a processor, wherein the processor is configured to:

receive an analog radio frequency (RF) signal over an analog optical link based on a radio-over-fiber (RoF) technology or an analog intermediate-frequency-over-fiber (IFoF) optical transmission technology;

filter the analog RF signal;

convert the filtered analog RF signal into a digital RF signal;

under-sample the converted digital RF signal;

determine a carrier to noise ratio (CNR) of an analog RF signal corresponding to the under-sampled digital RF signal; and monitor a transmission performance of the analog optical link using the analog RF signal of which the CNR is determined.

10. The monitoring apparatus of claim 9, wherein the processor is configured to receive an analog RF signal having a frequency of a band higher than that of a baseband signal.

11. The monitoring apparatus of claim 9, wherein the processor is configured to filter an analog RF signal based on a frequency range of a tone signal or a desired signal to be monitored.

12. The monitoring apparatus of claim 9, wherein the processor is configured to set a sampling frequency used for down-conversion to a digital RF signal having a lower frequency compared to that of the converted digital RF signal, and under-sample a digital RF signal converted using the sampling frequency.

13. The monitoring apparatus of claim 12, wherein the processor is configured to set a sampling frequency based on a high-frequency of the converted digital RF signal and a low-frequency of the converted digital RF signal.

14. The monitoring apparatus of claim 13, wherein a maximum frequency and a minimum frequency of the converted digital RF signal are determined based on a bandwidth of the converted digital RF signal.

15. The monitoring apparatus of claim 12, wherein the processor is configured to determine an integer value n for under-sampling the converted digital RF signal from the sampling frequency, the integer value n being greater than 1, and under-sample the converted digital RF signal into a Nyquist region based on the determined integer value n.

16. The monitoring apparatus of claim 9, wherein the processor is configured to convert the under-sampled digital RF signal into an analog RF signal and determine a CNR representing an amplitude difference between noise and a carrier wave from the converted analog RF signal.

* * * * *